United States Patent [19]

Takahashi

[11] 3,916,397

[45] Oct. 28, 1975

[54] CIRCULATING ACCESS MEMORY DEVICE

[75] Inventor: Kousuke Takahashi, Tokyo, Japan

[73] Assignee: Nippon Electric Company, Limited, Tokyo, Japan

[22] Filed: July 11, 1974

[21] Appl. No.: 487,471

[30] Foreign Application Priority Data

July 12, 1973 Japan ............................ 48-78998

July 20, 1973 Japan ............................ 48-81199

[52] U.S. Cl. .................... 340/174 TF; 340/174 SR

[51] Int. Cl.$^2$ .................................... G11C 19/08

[58] Field of Search ........................ 340/174 TF

[56] References Cited

UNITED STATES PATENTS 3,770,895 11/1973 Krupp et al. .................. 340/174 TF

*Primary Examiner*—James W. Moffitt

*Attorney, Agent, or Firm*—Sughrue, Rothwell, Mion, Zinn & Macpeak

[57] ABSTRACT

An improved circulating access memory is provided by connecting a desired number of sub-minor loops serially to each minor loop of a major-minor loop type bubble mass memory through a plurality of bubble switching circuits. Each of the bubble switching circuits comprises a bubble branching circuit adapted to transfer data between adjacent loops for swapping purposes and a bubble mixing circuit adapted to receive such transferred data. This organization is particularly useful in a high-speed auxiliary memory and offers the advantages of reduced bit cost and improved access time.

10 Claims, 5 Drawing Figures

CIRCULATING ACCESS MEMORY DEVICE

BACKGROUND OF THE INVENTION

The present invention relates to magnetic bubble domain devices and, more particularly, to a circulating access memory employing such devices which is adapted for use in high-speed auxiliary memories in memory and storage subsystems of electronic computers or electronic telephone exchange systems.

The memory system of present-day electronic computers comprises a main memory employing magnetic cores or semiconductor IC devices and a file memory in the form of magnetic discs or magnetic tapes. In this type of memory system, parts of programs and data may be stored in the main memory and the remainder may be stored in the file memory. Such prior-art memory systems, however, suffer from the following problems:

1. The capacity of the main memory is too small to store all programs and data therein:
2. The technique of multi-programming, e.g., by finely dividing the main memory into a plurality of partitions for the purpose of common use, is not feasible because of the fact that each partition, corresponding to each user, cannot store all the programs and data for each user, since the memory partitions are reduced in size;
3. If the capacity of the main memory becomes larger, at most several words are accessed at each moment, and thus the efficiency of the memory use becomes lowered.

As a solution to these problems, it has been the usual practice to employ the concept of overlay technique. This concept involves dividing the file memory into several segments for accommodating programs or data having a size larger than the capacity of the main memory. As the program proceeds, only the required segments can be fetched into the main memory. However, this concept requires an extremely troublesome effort on the part of a programmer to prepare programs for determining what segments should be loaded in the main memory in what space and at what moment. The result is a considerably increased software cost. A virtual memory system which permits automating such a memory allotting process has been developed and incorporated into memory systems of some electronic computers. The virtual memory system automatically effects a transfer of a segment or a page smaller in unit size than a segment in the main memory from the main memory to the file memory, where such segment or page is scarcely used or not used at least at that moment and also effects a loading of those segments or pages that are required at that moment, from the file memory into the main memory vacant space thereof. The virtual memory system performs the processing of address translation in association with those operations as well. In order to improve the performance of this system, it is preferable that the unit, i.e., the size of a segment or a page comprising programs and data to be swapped between the main memory and the file memory be small. However, in spite of the possible reduction in the unit, the virtual memory system still suffers from the problem that the access time of the file memory cannot be reduced to a great extend. It has been one of the most important concerns in this field of technology to develop memory systems with memory hierarchies wherein auxiliary memory is interposed between the main memory and the file memory.

SUMMARY OF THE INVENTION

It is a primary object of the present invention to provide an improved circulating access memory adapted for use in a high-speed auxiliary memory of computer systems.

It is another object of the present invention to provide a circulating access memory employing a magnetic bubble domain device and characterised by its improved access time and reduced bit cost.

These and other objects of the present invention are achieved by providing a novel magnetic bubble domain circuit of the type comprising a sheet of magnetic material capable of retaining bubble domains, means for applying a biasing magnetic field normal to the sheet, means for generating in-plane magnetic fields parallel to the surface of the sheet, and a ferromagnetic thin film overlay circuit disposed adjacent to the sheet and comprising bubble domain storage elements arranged to form a major loop serving as a circulating transfer loop, a plurality of minor loops serving as circulating memory loops, each of the minor loops being coupled to the major loop for bubble storage and readout, a plurality of sub-minor loops serving as circulating memory loops, and a plurality of bubble switching circuits each for switching bubble domains between its associated minor loop and sub-minor loop. Any desired number of sub-minor loops can be connected serially with each of the minor loops by means of one such switching circuit located between two adjacent loops. An eraser circuit may be coupled to the sub-minor loop remotest from its associated minor loop in order to permit quick erasing of data stored therein.

DETAILED DESCRIPTION OF PREFERRED EMBODIMENTS

At this point, it is believed that a more detailed discussion of the computer memory system will facilitate an understanding and an appreciation of the present invention.

Figure 1:
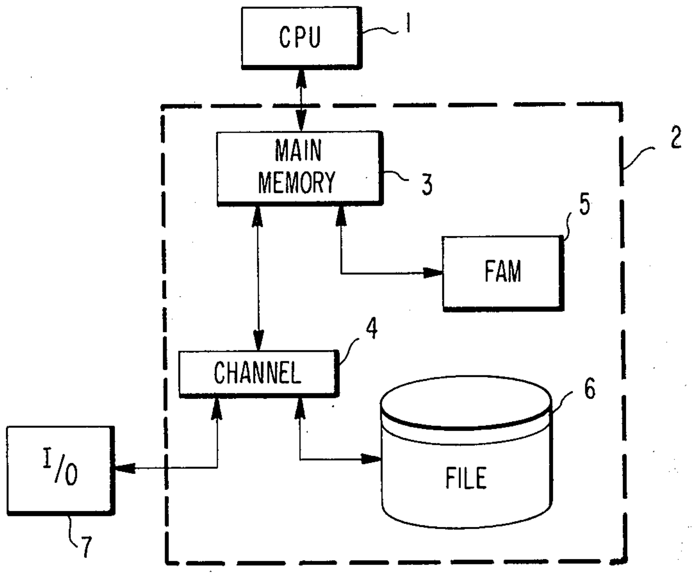
FIG. 1 is a block diagram of a computer system with memory hierarchy including a high-speed auxiliary memory.

FIG. 1 shows a block diagram of a computer system with memory hierarchy including a high-speed auxiliary memory 5. In the drawing, it is to be noted that a job incoming from an I/O unit 7 through a channel unit 4 is stored in a file memory 6 of a memory system 2 by dividing it into several job segments. In an electronic computer employing multiprogramming to enhance the utilization efficiency of a central processing unit 1, a number of jobs are simultaneously given into the electronic computer, and these jobs are stored in the file memory 6 in the form of divided job segments. Also, a main memory 3 is divided into several partitions, each for one job, and in each partition is stored a part of the pages related to its corresponding job. The high-speed auxiliary memory 5 stores a part of the segments related to each of the jobs in an effort to speed up the swap processing of information either page by page or segment by segment between the main memory 3 and the file memory 6. When a page is requested by the CPU 1, its logic address is sent to the main memory 3, but it occasionally happens that the page is not found in the main memory 3 (this occurrence being called "page fault"). In this case, if that particular page resides in the auxiliary memory 5, the requested page is transferred from the auxiliary memory 5 to the main memory 3 in place of a least used page in the main memory 3. On the other hand, if that page does not reside in the auxiliary memory 5, the required segment is written in the auxiliary memory 5 via the main memory 3 in place of a least used segment in the auxiliary memory. Some pages of the required segment are retained in the main memory 3 for subsequent use therein.

In the multi-programming system, if the page requested by the CPU 1 is found neither in the main memory 3 nor in the auxiliary memory 5, the CPU 1 interrupts the processing of the present job and commences the processing of another job. Otherwise, even though the required page is not found in the main memory 3, the CPU 1 waits for that page until it appears from the auxiliary memory 5, and then continues the processing of the present job. From the foregoing, it will be appreciated that the virtual average access time $To$ of the main memory 3 can be calculated by adding the product of the average access time $T2$ of the high-speed auxiliary memory 5 and a page fault ratio $\eta$ to the access time $T1$ of the main memory 3, as follows:

$$To = T1 + \eta T2,$$

where the page fault ratio $\eta$ is the probability of a failure in finding the required page in the main memory 3. This page fault ratio $\eta$ decreases with an increase of the memory size of the main memory 3 alloted to a job. It has been found that the rate of decrease of the ratio $\eta$ decreases abruptly when the memory size of the main memory 3 is increased to a certain extent (for instance, several ten kilobytes). The ratio $\eta$ can be easily reduced to $10^{-2}$, but not to $10^{-4}$. Therefore, to reduce $To$, it would be advisable to decrease $T2$ of the auxiliary memory 5, which, incidentally, has a relatively low bit cost, several hundred times less than $T1$, rather than modifying the expensive main memory 3.

Heretofore, magnetic drums of fixed head type discs have been in common use as high-speed auxiliary memories. However, in order to get the average access of such memories time below 1 millisecond, the bit cost must be unavoidably increased. Consequently this disadvantage prevents one from achieving the full advantage sought by using an auxiliary memory apparatus.

Recently, circulating memories such as a magnetic bubble (domain) device (MDD), a charge coupled device (CCD), and a MOS (Metal-Oxide Semiconductor) IC device have been high-lighted. Generally, the circulating access memory consisting of a magnetic bubble device has a major-minor loop construction. In this construction, a reduction in the access time requires an increase in the capacity of the memory, resulting in a higher cost.

Figure 2:
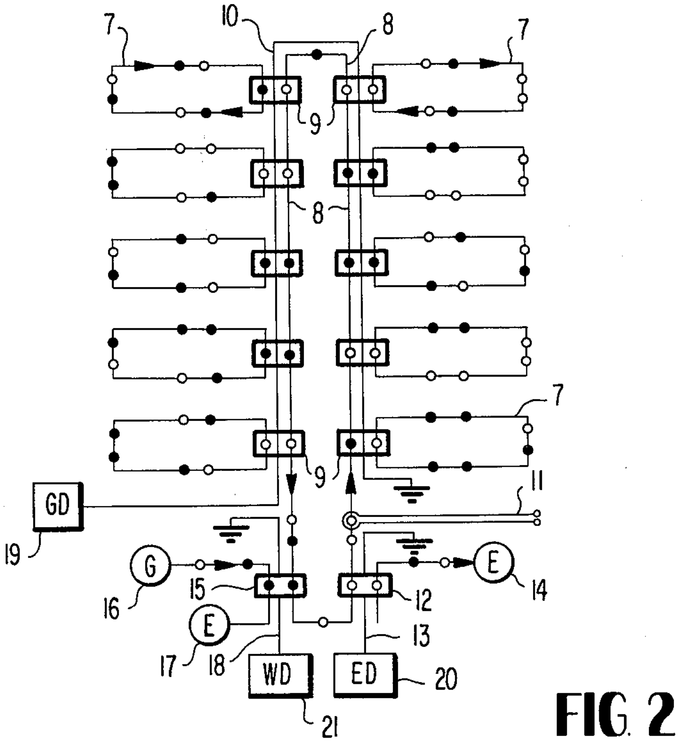
FIG. 2 PRIOR ART
FIG. 2 is a schematic diagram of a conventional bubble memory system of the major-minor loop construction.

FIG. 2 shows a well-known memory system of the major-minor loop construction employing a magnetic bubble device which is used as a circulating access memory in the auxiliary memory 5 of FIG. 1 (see Reference 1: an article titled "MAGNETIC BUBBLES," SCIENTIFIC AMERICAN, June issue, 1971, Pages 78 to 90). Although in practical applications a plurality of such memory constructions as shown in FIG. 2 are accommodated in one circulating access memory so as to operate in parallel to each other, a single memory construction will represent the entire device.

The propagation of bubble domains (or for ease of illustration cylindrical magnetic domains) within the magnetic bubble domain device depends upon a combined effect of a magnetic thin film (Permalloy) pattern disposed in contact with the surface of the device and a rotating magnetic field. The bubble domain propagation circuit formed by the thin film pattern comprises minor loops 7 and a major loop 8, the former being used for storing a plurality of pages, and the latter for transferring information from each selected page for readout. Circles in the respective loops represent the positions where bubble domains can exist at every moment; the white and black circles represent the absence and presence, respectively, of such magnetic bubble domains. Gate circuits 9 are controlled by a current fed from a gate driving circuit 19 to a transfer conductor 10 so as to control the transfer of the bubble domains between the minor loops 7 and the major loop 8. By designating the moment when transfer should be made, a particular page can be selected for readout.

Readout is accomplished as follows: When the information bits (presence or absence of a magnetic bubble) corresponding to a selected page appear in their respective loops 7 adjacent the respective gates 9, a control current is applied to transfer conductor 10. All such bits are effectively transferred simultaneously to the major loop 8. In this manner, the selection of a desired page is achieved. Subsequently, the series of the domains (page information) having entered the major loop 8 are transferred on the major loop 8 to a position where a detector element 11 is disposed. The bubble domains, after having been detected by the detector element 11, are returned to their original positions in the major loop 8, and then to the original positions in the minor loops 7 via the gate circuits 9. In order to restore the domains to their respective original positions in the minor loops 7, it is only necessary to select the length of the major loop 8 to be equal to an integral multiple of the length of each minor loop 7.

In the operation of rewriting information in a certain page, the page information is transferred from all the minor loops 7 through the gate circuits 9 to the major loop 8 as in the read operation. Then the page bits are transferred to a gate circuit 12 leading to an eraser circuit 14. An eraser driving circuit 20 then applies a control current to a transfer conductor 13 to transfer the information from the major loop 8 to the eraser 14. In this way, the previous information is erased. Thereafter, bubble domains corresponding to new information to be written in are inserted from a gate circuit 15 into the major loop 8. The domains are normally flowing from a generator circuit 16 to another eraser circuit 17, and in response to a control current fed from a write-in driving circuit 21 to a transfer conductor 18, the domains are transferred in a gate circuit 15 into the major loop 8. It will be apparent that any desired information can be written in the minor loops by selectively controlling the control current in accordance with the information. In this connection, it is to be noted that the feeding of the control current must be timed in a fairly precise manner, and for this purpose, it is necessary to provide an external timing control circuit.

In the above-described circulating access memory employing the magnetic bubble device, if the length of the major loop 8 (corresponding to the page size or bit number of each page) is represented by *M*, while the length of the minor loop 7 (corresponding to the number of pages) is represented by *m*, then the average access time *T2* can be obtained by $$T2 = (M + 0.5m)Ta,$$

where Ta represents a transfer time per bit and is in the order of 10 microseconds in the ordinary bubble device.

When such a circulating access memory is used to comprise the high-speed auxiliary memory 5 shown in FIG. 1, a large number of job segments must be stored therein. Assuming now that the number of the job segments is *B*, the number of the pages belonging to each job segment is *P*, and the size of each page is *W*, respectively, let us consider the case where $B = 32$, $P = 64$ and $W = 256$. The number of the pages (P × B) included in B job segments is larger than $2 \times 10^3$. In order to store all the pages in the major-minor loop system, *m* and *M* must be selected to equal P·B and *W*, respectively. It follows that the average acess time *T2* becomes (W + 0.5·P·B)Ta or larger. If the length of each minor loop 7 is limited to P so as to reduce the average access time *T2*, the reduced access time *T2* would be (W + 0.5P)Ta. However, in order to accommodate all the pages, it would be necessary to provide P stacks of memories of the major-minor loop construction. Also, since those stacks of memories are adapted to be selectively used, the detecting means, write-in means and rotating magnetic field generating means associated with each major loop would be increased to a value B times as many as that needed for one memory, with the undesirable result of increased per-bit cost.

One attempt to eliminate the above-mentioned disadvantages resulting from the prior-art devices has been proposed in a paper titled "Possible Uses of Charge-Transfer Devices and Magnetic Devices in Memory Hierachies" in IEEE TRANSACTIONS ON MAGNETICS, VOL. MAG-7, No. 3, Sept. issue, 1971, Pages 410 to 415 (Reference 2). Assuming here that the idea of this article is applied to the storage of (P × B) pages, the number of the minor loops 7 to be connected to the major loop 8 should be doubled, with the consequent doubling of the length of the major loop 8. Also, let it be assumed that each length ml of half of the minor loops 7 (first kind of minor loops 7) is P·(B—1) such that the first kind of minor loops 7 may store pages belonging to (B—1) segments and further that each length *m2* of the remaining half of minor loops 7 (second kind of minor loops) is P such that access to only pages of a segment required at present may be carried out at high speeds. In the manner as shown in FIG. 6 of the article, the average access time *T2* for an arbitrary page of a job segment stored in the second kind of minor loops 7 becomes (2*W* + 0.5·*P*)*Ta* and smaller. However, to exchange segment information between the first kind of shorter minor loops 7 and the second kind of longer minor loops 7, the first kind of minor loops 7 must be accessed by at least P times, and time required for that purpose is P·[2W + 0.5·P·(B − 1 ]Ta. Assuming here that $B = 32$, $P = 64$, $W = 256$ and $Ta =$ 10 microseconds, the time necessary for that purpose becomes 960 milliseconds which is remarkably long. Although the access time for the second kind of minor loops can be decreased, the required access time to swap the segments between the first kind of minor loops 7 and the second kind of minor loops 7 is disadvantageously long. Therefore, it can not be stated that memories of such construction as shown in FIG. 6 of Reference 2 are an improvement over the conventional major-minor loop system.

Figure 3:
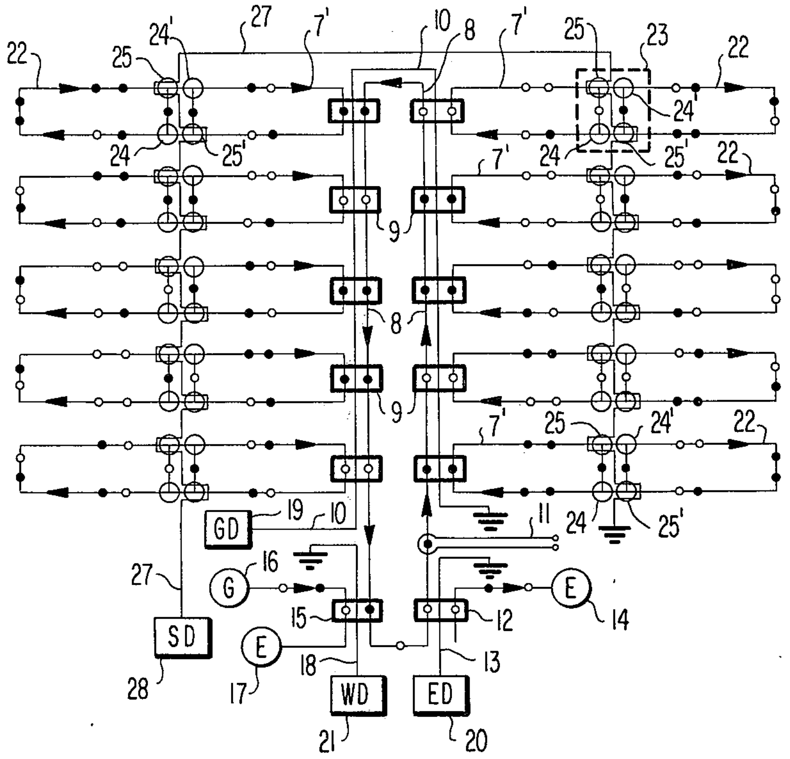
FIG. 3 is a schematic diagram of one embodiment of the present invention.

In FIG. 3, there is illustrated a block diagram of an improved memory device constructed in accordance with the teachings of the present invention. It will be apparent that the difference in construction between the systems shown in FIG. 2 and FIG. 3 resides in the provision of sub-minor loops 22 connected to each minor loop 7' via a switching circuit 23. In this construction, a plurality of job segments can share one major loop and its associated peripheral circuits which will be described in detail hereinafter. As will be seen, this configuration permits the memory to store only two job segments, since only one sub-minor loop 22 is coupled to each minor loop 7'. However, it should be understood that any desired number of sub-minor loops could be coupled serially to the minor loop 7' by means of such switching circuits as indicated by 23, so that it is possible to store a desired number of job segments and also to selectively utilize them in a synchronized manner.

Each switching circuit 23 comprises a pair of bubble branching circuits 25 and 25' and a corresponding pair of bubble mixing circuits 24 and 24'. The function of each switching circuit 23 is to switch the flow of magnetic domains or bubbles in response to a control signal fed from a switching signal driver circuit 28 through a switching conductor 27. More particularly, in the absence of the control signal on the conductor 27, the bubbles are diverted at right angles immediately after they have reached the branching circuits 25 and 25', so that there occurs a separate and independent circulation of bubbles in each of the minor loop 7' and the sub-minor loop 22. Application of the control signal to the switching conductor 27 will cause the bubbles to advance through the branching circuits 25 and 25'. The bubble mixing circuits 24 and 24' have the function of transferring bubbles incoming from their respective input directions to the minor loop 7' and the sub-minor loop 22, respectively. Accordingly, it will be appreciated that the swapping of job segments can be performed between a minor loop and a sub-minor loop by a mere application of the control signal. No difficulties are experienced in the timing adjustment at the time of swapping such job segments, insofar as the circulation of bubbles in both the minor loop and the sub-minor loop is synchronized.

With the arrangement in which a plurality of sub-minor loops are coupled serially to a minor loop via a plurality of switching circuits, it is possible to introduce each job segment into any desired minor loop or sub-minor loop in a synchronized manner by selectively controlling the switching circuit or circuits in an appropriate sequence. In this instance, if the total number of the minor loop 7' and the sub-minor loops serially connected thereto is equal to the number of the job segments stored, with a particular job segment associated with a memory partition in the main memory 3 (see FIG. 1) and to be executed at present by the CPU 1 having being stored in the minor loop 7' which is closest to the major loop 8, then the access time available with this circulating access memory device would be sufficiently small, though virtual.

Figure 4:
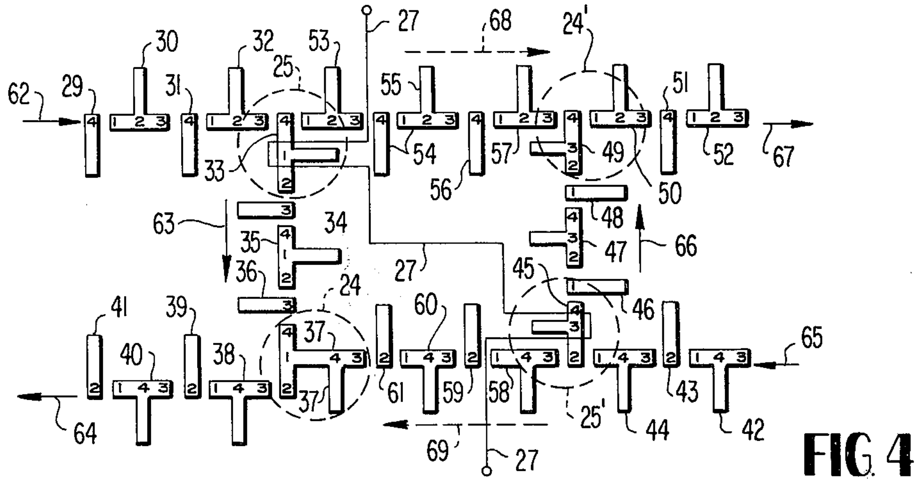
FIG. 4 is a detailed schematic diagram showing the construction of the switching circuits employed in the system of FIG. 3.

In FIG. 4, the preferred example of the switching circuit 23 is shown which includes the bubble branching circuits 25 and 25' and the bubble mixing circuits 24 and 24', as described and shown in FIG. 3. In the absence of a control current flowing through the switching conductor 27, an incoming bubble is caused to move under the influence of a rotating magnetic field in the direction of arrow 62 through the Permalloy thin film pattern of T's and bars indicated by 29, 30, 31, 32 and 33. The T33 in the branching circuit 25 is configured and positioned such that the distance between its poles 1 and 4 is smaller than the distance between the pole 4 of the T33 and the pole 1 of the adjacent T53. Thus, upon arriving at the T33, the bubble is caused to move at right angles and to proceed in the direction of arrow 63 through T's and bars 34, 35, 36 and 37. Thereafter, the bubble is moved at right angles in the leftward direction as viewed in the drawing, advancing through T's and bars 38, 39, 40 and 41. In a like manner, a bubble supplied from the direction of arrow 65 is caused to move through the Permalloy thin film pattern of T's and bars designated at 42, 43, 44, 45, 46, 47, 48, 49, 50, 51 and 52 under the influence of the rotating magnetic field. It is to be noted that the pole 2 of the T45 in the branching circuit 25' is arranged to be closer to the pole 3 of T45 than pole 3 of T58. Thus, it will be appreciated that the minor loop 7' and the sub-minor loop 22 function independently of each other to cause a circulation of bubbles.

Upon the supply of a control current to the switching conductor 27, there occurs a decrease of the magnetic field within a loop surrounding the pole 1 of the T33. Thus, a magnetic domain or bubble which has moved from the T32 to the T33 in the branching circuit 25 further is caused to move in the direction of arrow 68 through T's and bars 53, 54, 55, 56, 57, 49, 50, 51 and 52.

In a like manner, a magnetic domain which has moved from the T44 to the T45 further proceeds toward a T59 along the direction of arrow 69 because of a reduction in the magnetic field on the pole 3 of the T45 in the branching circuit 25' caused by the control current. Thereafter, the magnetic domain moves through T's and bars 59, 60 and 61 and further through T's and bars 37, 38, 39, 40 and 41 in the direction of arrow 64. It is to be noted that in order to prevent the magnetic domains moving along the directions of arrow 68 and 69 from crossing or meeting with the magnetic domains incoming from the directions of arrow 66 and 63 in the bubble mixing circuits 24 and 24', respectively, subsequent to the switching of bubble flows by the bubble branching circuits 25 and 25', it is necessary to select the propagation time of the domains along the respective directions of arrow 63, 66, 68 and 69 to be equal to each other. A bubble switching circuit suitable for use in this invention is described, for example, in an article titled "Application of Bubble Devices" (IEEE TRANSACTIONS ON MAGNETICS, VOL. MAG-6, No. 3, Sept. issue, 1970, pp. 447 to 451 (Reference 3).

Accordingly, it will be understood that by a mere application of a control current to the switching conductor 27, the information coded in a bubble stream can be swapped between the minor loop 7' and the sub-minor loop 22, which means that it is possible to selectively utilize a large number of circulating access memories in a synchronized manner without the use of many sets of detectors, write circuits and magnetic field generators.

Figure 5:
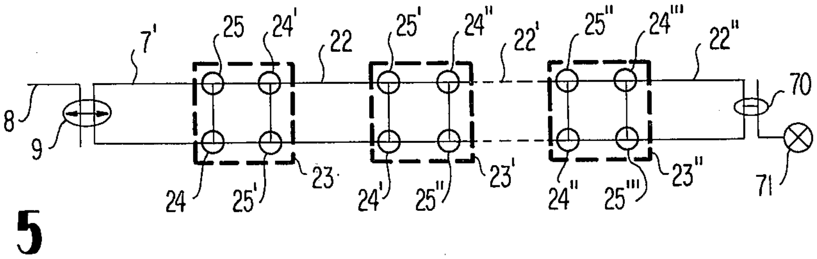
FIG. 5 is a fragmentary schematic diagram showing a modification of the system of FIG. 3.

In FIG. 5, it will be seen that three sub-minor loops 22, 22' and 22'' are serially coupled to a minor loop 7' by means of switching circuits 23, 23' and 23''. This arrangement enables all the pages included in a plurality of job segments to share all peripheral circuits, i.e., the minor and sub-minor loops associated with one major loop. Also, the job segments can be stored in the serially connected sub-minor loops sequentially in the order of frequency of use. In this case, the access time for the least recently used job segment is larger than that for the most recently used one. An eraser circuit 71 may be provided at the final sub-minor loop 22'' through a gate circuit 70 to permit the erasing of the oldest job segment for the short time (P·Ta). Such an eraser circuit is disclosed in a paper "IBM Technical Disclosure Bulletin Vol. 14, No. 6, Nov. issue, 1971, Page 1875" (Reference 4).

Let it be assumed now that B job segments are stored in the circulating access memory of the construction shown in FIG. 5. As described above, those B job segments can be accessed from the single major loop 8. P pages of information included in each job segment are stored either in the minor loop 7' or one of the sub-minor loops 22, 22' and 22''. The job segment used now is stored in the minor loop 7' closest to the major loop 8, so that the average access time for the pages of the particular job segment is $(W + 0.5 \cdot P)Ta$ which is smaller than the average access time available in the device shown in FIG. 6 of Reference 2.

Also, the time necessary for swapping the job segments between the minor loop 7' and the adjacent sub-minor loop 22 is only $P \cdot Ta$. Therefore, the time required to transfer the job segment from the sub-minor loop 22'' remotest from the major loop 8 to the minor loop 7' nearest to the major loop 8 is only (B-1) times for $P \cdot Ta$. The average swapping time of job segments is $0.5P \cdot (B-1)Ta$ which is below 1/P of that in the case of FIG. 6 in Reference 2.

In addition, according to the job scheduling techniques employed in the recent operating system, the job segment used at present is stored in the minor loop 7' nearest to the major loop 8, and a job segment to be secondly used is stored in the sub-minor loop 22 immediately adjacent to the minor loop 7'. This permits a reduction the swapping time up to almost $P \cdot Ta$, where P is, of course, the number of pages included in a job segment.

As has been described above, the circulating access memory according to the present invention provides an improvement over the prior-art devices of the conventional configuration, offering the advantages of a reduced cost per bit and a decreased access time.

In the foregoing description of the present invention, it has been assumed that the circulating access memory is organized by the use of a magnetic bubble device, that the bit number of one minor loop 7' is equal to that of one sub-minor loop 22, and that the job segments stored in the various sub-minor loops 22 and 22' are different from each other. However, it should be understood that other kinds of devices such as a semiconductor IC device and charge coupled devices (CCD) could equally be employed to comprise the circulating access memory. Moreover, the bit number of the minor loop 7' and the sub-minor loop may be different from each other. Also, the same job segments may be stored in both the sub-minor loops 22 and 22'.

What is claimed is:

1. A circulating access memory device comprising: a first circulating memory circuit forming a major loop; second circulating memory circuits forming a plurality of minor loops each coupled to the major loop through each gate circuit; read-out signal detector means, information write-in means and information erasing means each of which means is coupled to the first memory circuit; switching means each coupled to one of the second memory circuits; third circulating memory circuits forming a plurality of sub-minor loops and coupled to the respective switching circuits; and a switching control circuit for controlling the switching circuits to swap the stored information among each second memory circuit and the corresponding each third memory circuit.

2. A circulating access memory device as claimed in claim 1 further comprising eraser circuits in the final stage of the third circulating memory circuits.

3. A circulating access memory device comprising: major loop means for circulating data therein, a plurality of minor loop means for circulating data therein, each said minor loop means being positioned adjacent said major loop means, gate means for controllably transferring data between said minor loop means and said major loop means; writing means for writing data into said major loop means; eraser means connected to said major loop means for erasing data stored in said major loop means; a plurality of sub-minor loop means for circulating data therein, each said sub-minor loop means being associated with one of said minor loop means, and switching means for switching data between each of said minor loops and its associated sub-minor loop means.

4. A circuit as set forth in claim 3, further comprising second eraser means connected to each of said sub-minor loop means for erasing data circulating therein.

5. A circuit as set forth in claim 3, further comprising means for controlling the operation of said switching means to swap data between each of said minor loop means and its associated sub-minor loop means.

6. In a magnetic bubble domain circuit of the type comprising a sheet of magnetic material capable of retaining bubble domains, means for applying a biasing magnetic field normal to the sheet, means for generating in-plane magnetic fields parallel to the surface of the sheet, and a ferromagnetic thin film overlay circuit disposed adjacent to the sheet and comprising bubble domain storage elements arranged to form a major loop serving as a circulating transfer loop and a plurality of minor loops serving as circulating memory loops, said bubble domains being adapted to be transferred between said major loop and each of said minor loops, the improvement comprising: means for defining on the sheet a plurality of sub-minor loops serving as circulating memory loops, and switching means for switching bubble domains between each of said minor loops and its associated sub-minor loop.

7. A circuit as set forth in claim 6, wherein said switching means comprises a bubble branching circuit and a bubble mixing circuit provided at each junction of said minor loops and said sub-minor loops, said bubble branching circuits operating to transfer bubbles between their associated adjacent loops, said bubble mixing circuits operating to receive such transferred bubbles.

8. A circuit as set forth in claim 6, further comprising: means for defining on the sheet a second plurality of sub-minor loops serving as circulating memory loops; and second switching means for switching bubble domains between each of said second plurality of sub-minor loops and its associated one of said sub-minor loops coupled to said minor loops.

9. A circuit as set forth in claim 6, wherein each of said minor loops has a plurality of sub-minor loops connected thereto in series with each other.

10. A circuit as set forth in claim 9, further comprising a bubble eraser connected to the sub-minor loop remotest from its associated one of said minor loops.

* * * * *